(12) United States Patent
Shikama et al.

(10) Patent No.: US 11,638,961 B2
(45) Date of Patent: May 2, 2023

(54) TOOL BODY OF CUTTING TOOL FOR INDEXABLE INSERTS, AND ROUND MILLING INSERT

(71) Applicant: TUNGALOY CORPORATION, Fukushima (JP)

(72) Inventors: Hiroya Shikama, Iwaki (JP); Ryuichi Saji, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/643,019

(22) Filed: Dec. 7, 2021

(65) Prior Publication Data
US 2022/0288706 A1  Sep. 15, 2022

(30) Foreign Application Priority Data
Mar. 10, 2021 (JP) .............................. JP2021-038029

(51) Int. Cl.
*B23C 5/22* (2006.01)
*B23C 5/20* (2006.01)
(Continued)

(52) U.S. Cl.
CPC ............ *B23C 5/2213* (2013.01); *B23C 5/006* (2013.01); *B23C 2200/045* (2013.01); *B23C 2200/162* (2013.01); *B23C 2200/168* (2013.01)

(58) Field of Classification Search
CPC . B23C 5/2213; B23C 5/006; B23C 2200/045; B23C 2200/128; B23C 2200/162; B23C 2210/168; B23C 2200/168; B23C 5/20; B23C 5/02; B23C 5/22; B23B 2265/34
See application file for complete search history.

(56) References Cited

U.S. PATENT DOCUMENTS 6,238,133 B1   5/2001  DeRoche et al.
7,121,771 B2 * 10/2006  Englund ............... B23B 27/164
                                                                       407/111
(Continued)

FOREIGN PATENT DOCUMENTS

JP         11245105 A  *  9/1999  ............. B23C 5/109
JP       H11-245105 A     9/1999
(Continued)

*Primary Examiner* — Sara Addisu
(74) *Attorney, Agent, or Firm* — Studebaker & Brackett PC (57) ABSTRACT

A cutting tool body for indexable inserts, and a round milling insert, are configured not to cause floating or rattling upon mounting the milling insert. The tool body includes a recessed portion for fitting one of a plurality of protrusions thereto, the protrusions being formed in the milling insert to protrude in the radial direction. The recessed portion has two inner surfaces having curved portions disposed so the distance between them gradually decreases at the contact area between the recessed portion and the protrusion fitted thereto. The milling insert includes protrusions protruding radially, any of which fit into a recessed portion on a mounting seat of the tool body. The protrusions each have two curved outer surfaces arranged so the distance between them gradually decreases toward a tip of the protrusion, at the contact area between the protrusion and the recessed portion into which the protrusion is fitted.

3 Claims, 7 Drawing Sheets

(51) Int. Cl.
*B23C 5/02* (2006.01)
*B23C 5/00* (2006.01)

(56) References Cited

U.S. PATENT DOCUMENTS

| | | | |
|---|---|---|---|
| 7,488,142 B2* | 2/2009 | Englund | B23B 27/1622 |
| | | | 407/103 |
| 2006/0245837 A1* | 11/2006 | Dufour | B23C 5/06 |
| | | | 407/48 |
| 2010/0054873 A1* | 3/2010 | Men | B23B 27/16 |
| | | | 407/42 |
| 2012/0070239 A1 | 3/2012 | Park et al. | |
| 2014/0348600 A1 | 11/2014 | Matsubara et al. | |
| 2017/0291233 A1* | 10/2017 | Marie | B23C 5/2247 |

FOREIGN PATENT DOCUMENTS

| | | |
|---|---|---|
| JP | 2001-038519 A | 2/2001 |
| JP | 2002-527251 A | 8/2002 |
| JP | 2014-024124 A | 2/2014 |
| KR | 10-2006-0021761 A | 3/2006 |
| WO | 00/23218 A1 | 4/2000 |
| WO | 01/87523 A1 | 11/2001 |

\* cited by examiner

TOOL BODY OF CUTTING TOOL FOR INDEXABLE INSERTS, AND ROUND MILLING INSERT

BACKGROUND

Field

The present invention relates to a tool body of a cutting tool for indexable inserts in which a round milling insert is used as a indexable insert, and the round milling insert.

Description of Related Art

In a conventional cutting tool for indexable inserts in which a round milling insert is used as a indexable insert, in order to stably fix the round milling insert to a support seat, said cutting tool is designed in such a manner that the side faces of a protrusion of the round milling insert come into contact with the side faces of a recessed portion of the support seat (see Patent Publication JP-A-2014-24124).

SUMMARY

Although the side faces of the protrusion of the round milling insert are designed to come into contact with the side faces of the recessed portion of the support seat of the tool body, it is often the case that these side faces actually do not come into surface contact with each other due to machining accuracy or assembly error but come into point contact or line contact with each other at some parts. The side faces that come into contact with each other at unexpected parts may cause the round milling insert to float or rattle.

The present invention was contrived in order to solve these problems, and an object thereof is to provide a tool body of a cutting tool having a indexable insert and a round milling insert that are configured not to float or rattle when mounted, by keeping the contact part between the round milling insert and the tool body at a predetermined scheduled part.

A tool body according to one aspect of the present invention is a tool body onto which a round milling insert is mounted to configure a cutting tool for indexable inserts, wherein a mounting seat for mounting the round milling insert includes a seating surface coming into contact with one surface of the round milling insert, a female screw hole provided in the seating surface to receive a male screw for fixing the round milling insert, and a recessed portion provided so that only one of a plurality of protrusions is fitted thereto, the plurality of protrusions being formed in the round milling insert so as to protrude in a radial direction, and the recessed portion has both inner surfaces thereof formed of curved surfaces in such a manner that a distance therebetween gradually decreases toward a depth portion, at a contact area between the recessed portion and said protrusion fitted thereto out of the plurality of protrusions.

A round milling insert according to one aspect of the present invention is a round milling insert mounted onto a tool body to configure a cutting tool for indexable inserts, the round milling insert comprising a plurality of protrusions formed so as to protrude in a radial direction, any of the plurality of protrusions being able to be fitted into a recessed portion provided on a mounting seat of the tool body, wherein each of the protrusions has both outer surfaces thereof formed of curved surfaces in such a manner that a distance therebetween gradually decreases toward a tip of the protrusion, at a contact area between the protrusion and the recessed portion into which the protrusion is fitted.

The present invention can provide a tool body of a cutting tool for indexable inserts and a round milling insert that are configured not to cause floating or rattling when the round milling insert is mounted, by keeping the contact part between the round milling insert and the tool body at a predetermined part.

DETAILED DESCRIPTION

An embodiment of the present invention is now described hereinafter with reference to the accompanying drawings. Note that, in each diagram, those having the same reference numerals have the same or similar configurations. In addition, in each diagram, when a plurality of structures with the same or similar configuration are present, reference numerals may be given to some of the structures and the same reference numerals may not be given to the other structures, in order to avoid complications.

Figure 1:
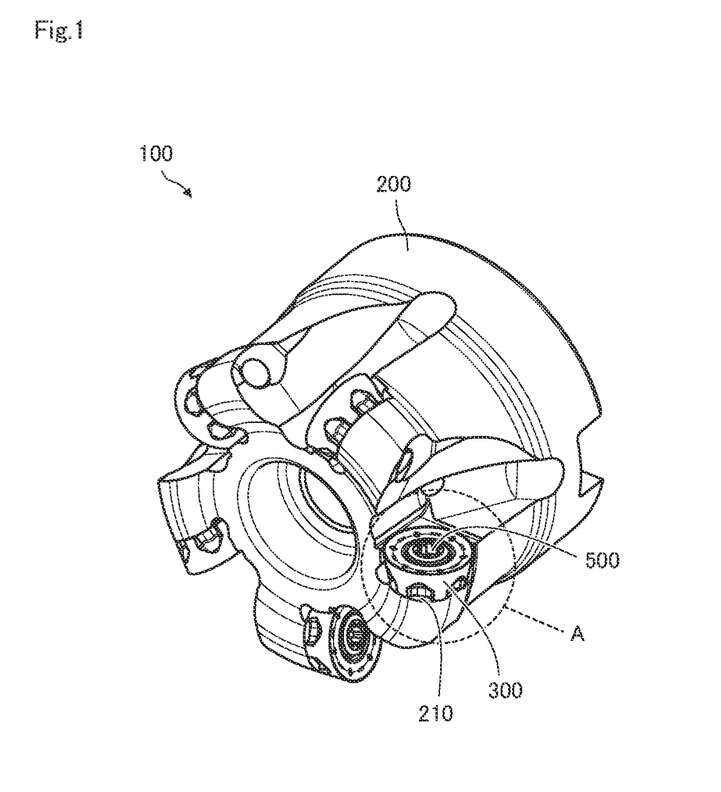
FIG. 1 is an overall perspective view of a cutting tool according to an embodiment.

FIG. 1 is an overall perspective view of a cutting tool 100 which is a cutting tool for indexable inserts according to the present embodiment. The cutting tool 100 is composed of a tool body 200, a round milling insert 300 to be mounted on the tool body, and a male screw 500 which is a clamp screw for fixing the round milling insert 300 to the tool body.

Mounting seats 210 are provided on an outer peripheral portion of a tip of the tool body 200 at regular intervals along a circumferential direction. As illustrated in the diagram, the tool body 200 according to the present embodiment is provided with five mounting seats at intervals of 72 degrees. The round milling insert 300 is fixed to each of the mounting seats 210 by means of the male screw 500.

Figure 2A:
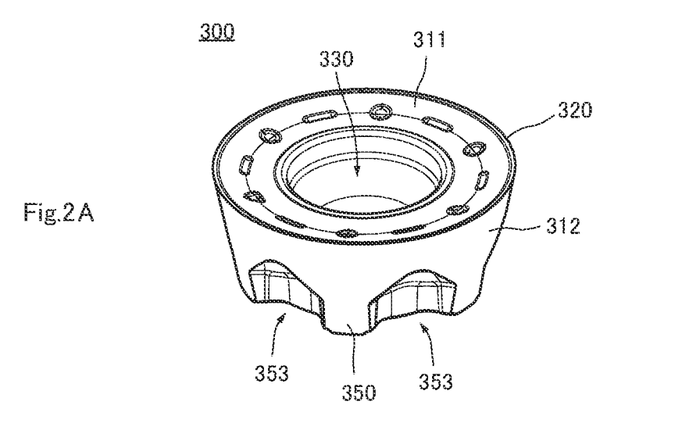
FIGS. 2A and 2B are overall perspective views of a round milling insert with six corners.
Figure 2B:
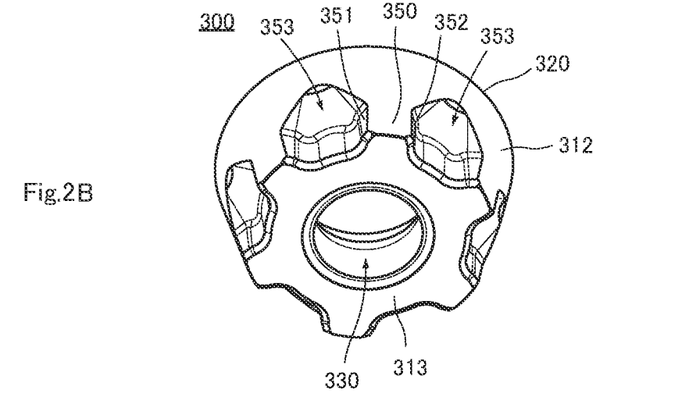

FIGS. 2A and 2B are overall perspective views of the round milling insert 300 with six corners that has six mounting parts. FIG. 2A is a bird's-eye view of the round milling insert 300, and FIG. 2B is a diagram looking up at the round milling insert 300. The round milling insert 300 has a substantially circular truncated cone shape as a whole, and includes a large-diameter upper surface 311, a small-diameter bottom surface 313, and a side surface 312 connecting the upper surface 311 and the bottom surface 313. A cutting blade 320 is provided along a circumferential ridge line of the upper surface 311. When the round milling insert 300 is mounted on a mounting seat 210 of the tool body 200, the cutting blade 320 partially protrudes from the tip of the tool body 200.

The round milling insert 300 includes a mounting hole 330 through which the male screw 500 penetrates so as to penetrate the central axis of the circular truncated cone shape. Drilling portions 353 are provided at equal intervals in the circumferential direction on the bottom surface 313 side of substantially the lower half of the circular truncated cone shape. Since the round milling insert 300 is an insert with six corners, six drilling portions 353 are provided at intervals of 60 degrees. The drilling portions 353 each have a shape obtained by scraping and removing a part extending from the side surface 312 to the bottom surface 313. As a result of providing the drilling portions 353, a protrusion 350 is formed between two drilling portions 353 adjacent to each other, so as to protrude in a radial direction. The round milling insert 300 has six protrusions 350. In the present embodiment, viewing from the bottom surface 313 side, the outer surface of each of the protrusions 350 in the counterclockwise direction is a first outer surface 351, and the outer surface of the same in the clockwise direction is a second outer surface 352.

The six protrusions 350 have an identical shape. Specifically, as will be described hereinafter, any of the protrusions 350 can be fitted into a recessed portion provided in the mounting seat 210 of the tool body 200. In other words, the round milling insert 300 having the six protrusions 350 can be fixed to the mounting seat 210 in six directions (phases) by fitting the protrusion 350 into the recessed portion provided in the mounting seat 210. When the cutting blade 320 reaches its usage limit in a certain phase, the user can change the phase and reattach the round milling insert 300 to use the cutting blade 320 again.

Figure 3A:
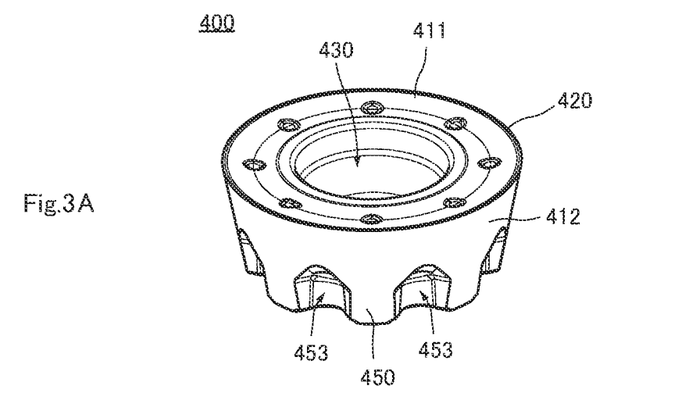
FIGS. 3A and 3B are overall perspective views of a round milling insert with eight corners.
Figure 3B:
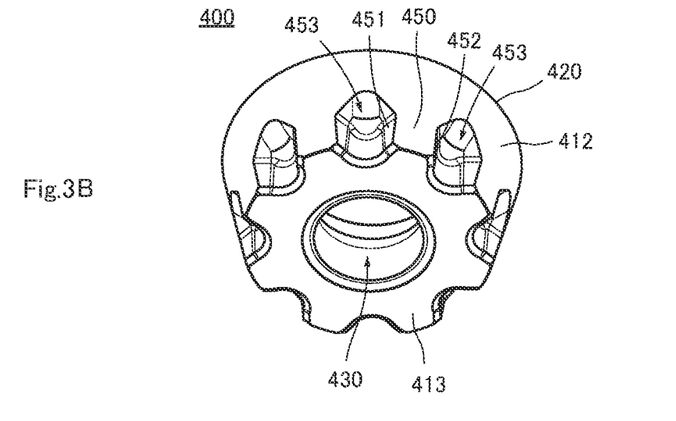

FIGS. 3A and 3B are overall perspective views of a round milling insert 400 with eight corners that has eight mounting parts. FIG. 3A is a bird's-eye view of the round milling insert 400, and FIG. 3B is a diagram looking up at the round milling insert 400. The structure of the round milling insert 400 is the same as that of the round milling insert 300 with the six corners. The round milling insert 400 has a substantially circular truncated cone shape having the same size as the round milling insert 300 as a whole, and includes a large-diameter upper surface 411, a small-diameter bottom surface 413, and a side surface 412 connecting the upper surface 411 and the bottom surface 413.

As with the round milling insert 300, a cutting blade 420 is provided along a circumferential ridge line of the upper surface 411, and includes a mounting hole 430 through which the male screw 500 penetrates so as to penetrate the central axis of the circular truncated cone shape. As with the round milling insert 300, the round milling insert 400 includes drilling portions 453 arranged at equal intervals in the circumferential direction on the bottom surface 413 side of substantially the lower half of the circular truncated cone shape, but since the round milling insert 400 is an insert with eight corners, eight drilling portions 453 are provided at intervals of 45 degrees, and as a result, eight protrusions 450 are formed so as to protrude in the radial direction. In the present embodiment, viewing from the bottom surface 413 side, the outer surface of each of the protrusions 450 in the counterclockwise direction is a first outer surface 451, and the outer surface of the same in the clockwise direction is a second outer surface 452.

The eight protrusions 450 have an identical shape and also have the same shape as that of the protrusions 350 of the round milling insert 300. Therefore, any of the protrusions 350 can be fitted into the recessed portion provided in the mounting seat 210 of the tool body 200. In other words, the round milling insert 400 having the eight protrusions 450 can be fixed to the mounting seat 210 in eight directions (phases) by fitting the protrusion 450 into the recessed portion provided in the mounting seat 210. When the cutting blade 420 reaches its usage limit in a certain phase, the user can change the phase and reattach the round milling insert 400 to use the cutting blade 320 again.

Note that although the present embodiment has described the round milling insert 300 with the six corners and the round milling insert 400 with the eight corners, any round milling insert having any number of corners can be mounted onto the tool body 200 as long as said round milling insert has protrusions in the same shape as the round milling inserts 300 and 400. In the following description, an example of mounting the round milling insert 300 is described, but the example can also be applied to mounting other round milling inserts.

Figure 4:
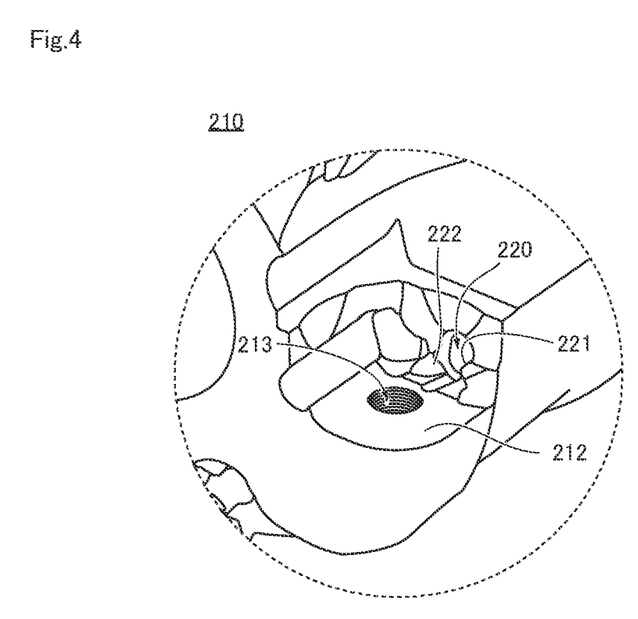
FIG. 4 is a partially enlarged view of a mounting seat.

FIG. 4 is a partially enlarged view of the mounting seat 210 in which the round milling insert 300 is removed in part A shown in FIG. 1. The mounting seat 210 includes a seating surface 212 coming into contact with the bottom surface 313 of the round milling insert 300, a female screw hole 213 provided in the seating surface 212 to receive the male screw 500, and a recessed portion 220 provided so that one of the protrusions 350 of the round milling insert 300 is fitted thereto.

The recessed portion 220 is drilled in a direction away from the central axis of the female screw hole 213 (depth direction), and as a result, a first inner surface 221 and a second inner surface 222 are formed as two inner surfaces with respect to the depth direction. In the present embodiment, in a bird's-eye view of the seating surface 212, the inner surface of the recessed portion 220 in the clockwise direction is the first inner surface 221, and the inner surface of the same in the clockwise direction is the second inner surface 222.

Figure 5:
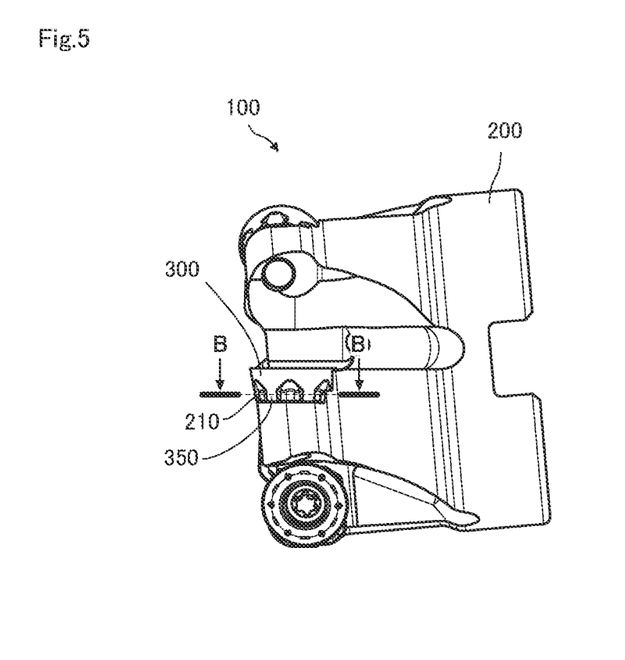
FIG. 5 is a diagram of the cutting tool viewed from the side.
Figure 6:
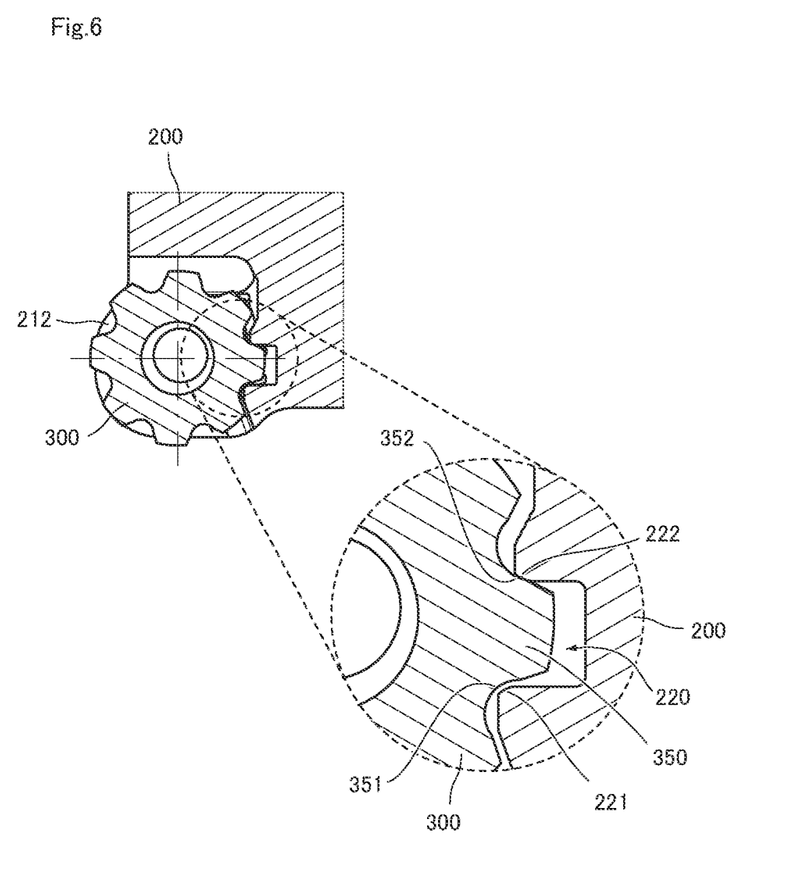
FIG. 6 is a cross-sectional view showing a contact section between a round milling insert and a tool body.

FIG. 5 is a diagram of the cutting tool 100 viewed from the side. FIG. 6 is a cross-sectional view taken along B-B shown in FIG. 5, that is, a cross-sectional view taken along a plane including the protrusion 350 of the round milling insert 300 mounted on the mounting seat 210. More specifically, FIG. 6 is a cross-sectional view showing a contact section between the round milling insert 300 and the tool body 200.

As described above, the protrusion 350 of the round milling insert 300 is fitted into and fixed to the recessed portion 220 of the mounting seat 210. The phase of the round milling insert 300 is fixed by the meshing between the protrusion 350 and the recessed portion 220. In other words, the meshing between the protrusion 350 and the recessed portion 220 functions to stop the round milling insert 300 from turning.

The areas in the recessed portion 220 that are scheduled to come into contact with the protrusion 350 are the first inner surface 221 and the second inner surface 222, which are part of the both inner surfaces of the recessed portion 220. The areas in the protrusion 350 that are scheduled to come into contact with the recessed portion 220 are the first outer surface 351 and the second outer surface 352, which are part of the both outer surfaces of the protrusion 350. In other words, the first inner surface 221 and the first outer surface 351 are scheduled to come into contact with each other, and the second inner surface 222 and the second outer surface 352 are scheduled to come into contact with each other.

Figure 7:
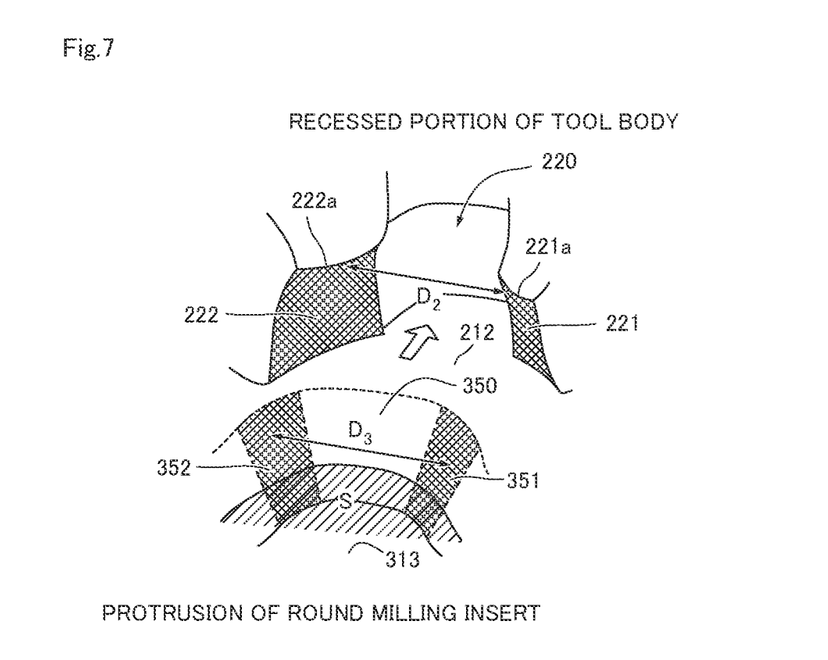
FIG. 7 is a diagram schematically showing a contact area between the round milling insert and the tool body.

Once the round milling insert 300 is actually fixed by means of the male screw 500, either one of the aforementioned surface pairs may come into contact with each other and a gap may be formed in the other surface pair, depending on the tolerance and machining accuracy. In the illustrated example, a gap is formed between the first inner surface 221 and the first outer surface 351, whereas the second inner surface 222 and the second outer surface 352 are in contact with each other. For example, when the round milling insert 300 is fixed to the mounting seat 210, the first inner surface 221 and the first outer surface 351 come into contact with each other as a result of the rotational force of the male screw 500 fastened clockwise, and the second inner surface 222 and the second outer surface 352 come into contact with each other as a result of the cutting force generated during cutting FIG. 7 is a diagram schematically showing the contact areas between the round milling insert 300 and the tool body 200. Specifically, FIG. 7 is a diagram schematically showing a state in which the round milling insert 300 is slid on the seating surface 212 to slightly separate the protrusion 350 from the recessed portion 220, the state being observed through the inside of the protrusion 350.

As described above, the areas in the recessed portion 220 that are scheduled to come into contact with the protrusion 350 are the first inner surface 221 and the second inner surface 222, which are part of the both inner surfaces of the recessed portion 220. The first inner surface 221 and the second inner surface 222 are each formed of a curved surface in such a manner that a distance D2 therebetween gradually decreases toward the depth indicated by the white arrow. Also, the first inner surface 221 and the second inner surface 222 are developed so as to protrude upward from respective rising portions thereof at the respective boundaries with the seating surface 212 toward the internal space, forming a first ridge line 221a and a second ridge line 222a at the respective boundaries with upper surfaces of the first and second inner surfaces. In other words, the first ridge line 221a and the second ridge line 222a are the portions of the first inner surface 221 and the second inner surface 222 that protrude the most toward the internal space of the recessed portion 220. The recessed portion 220 comes into contact with the protrusion 350 by at least either the first ridge line 221a or the second ridge line 222a.

As described above, the areas in the protrusion 350 that are scheduled to come into contact with the recessed portion 220 are the first outer surface 351 and the second outer surface 352, which are part of the both outer surfaces of the protrusion 350. The first outer surface 351 and the second outer surface 352 are each formed of a curved surface in such a manner that a distance D3 therebetween gradually decreases toward the tip of the protrusion shape. Furthermore, the first outer surface 351 and the second outer surface 352 are formed in such a manner that an area S of the cross section parallel to the bottom surface 313 of the protruding portion gradually increases in the direction away from the bottom surface 313. In particular, in the present embodiment, the first outer surface 351 and the second outer surface 352 are each formed as a part of a circular truncated cone surface. The protrusion 350 comes into contact with the recessed portion 220 by at least either the first outer surface 351 or the second outer surface 352.

By realizing such three-dimensional configuration, the contact part between the round milling insert 300 and the tool body 200 can be kept at a certain scheduled part, thereby providing the cutting tool 100 that is configured not to cause floating or rattling when mounted with the round milling inserts. In addition, since the ridge lines come into contact with the curved surfaces, the stress concentration can be relaxed as compared with the contact with flat surfaces, and the plastic deformation of the contact portions can be reduced. Furthermore, by limiting the contact part to at least either the first ridge line 221a or the second ridge line 222a away from the seating surface 212, the force for pressing the round milling insert 300 against the seating surface 212 acts to further suppress the rattling. In the replaceable round milling insert 400 as well, since the protrusions 450 are formed in the same manner as the protrusions 350, the same effects can be achieved.

What is claimed is:

1. A tool body onto which a round milling insert is mounted to configure a cutting tool for indexable inserts, wherein
    a mounting seat for mounting the round milling insert includes
    a seating surface coming into contact with one surface of the round milling insert,
    a female screw hole provided in the seating surface to receive a male screw for fixing the round milling insert, and
    a recessed portion provided so that only one of a plurality of protrusions is fitted thereto, the plurality of protrusions being formed in the round milling insert so as to protrude in a radial direction,
    the recessed portion has two opposed inner surfaces, each having a curved surface portion and a depth portion, the inner surfaces being disposed such that a distance between their respective curved surface portions gradually decreases toward their respective depth portions, at a contact area between the recessed portion and said protrusion fitted thereto out of the plurality of protrusions, and
    in the contact area, the inner surfaces respectively include ridge lines facing each other and protruding toward an internal space.

2. A round milling insert mounted onto a tool body to configure a cutting tool for indexable inserts, the round milling insert comprising
    a plurality of protrusions formed so as to protrude in a radial direction, any of the plurality of protrusions being able to be fitted into a recessed portion provided on a mounting seat of the tool body, wherein
    each of the protrusions has two outer surfaces, each having a curved surface portion, the outer surfaces being disposed such that a distance between their respective curved surface portions gradually decreases toward a tip of the protrusion, at a contact area between the protrusion and the recessed portion into which the protrusion is fitted, and
    the outer surfaces of the protrusion are formed such that an area of a cross section parallel to a bottom surface of the protrusion gradually increases in a direction away from the bottom surface, the bottom surface being in contact with a seating surface of the mounting seat.

3. The round milling insert according to claim 2, wherein the outer surfaces are each formed as a part of a circular truncated cone surface.

* * * * *